United States Patent
Bolen et al.

[11] Patent Number: 6,164,994
[45] Date of Patent: Dec. 26, 2000

[54] LOOP BACK CLOCKSPRING HAVING ADHESIVE LAYER

[75] Inventors: Patrick A. Bolen; Brent E. Henderson; James K. Pettit, all of Carthage, Ill.; John A. DeFranco, Farmington Hill, Mich.

[73] Assignee: Methode Electronics, Inc., Chicago, Ill.

[21] Appl. No.: 09/404,946

[22] Filed: Sep. 24, 1999

[51] Int. Cl.$^7$ ...................................................... H01R 35/04
[52] U.S. Cl. ............................................................. 439/164
[58] Field of Search ....................................... 439/164, 15

[56] References Cited

U.S. PATENT DOCUMENTS

| | | | |
|---|---|---|---|
| 5,490,793 | 2/1996 | Bolen | 439/164 |
| 5,813,875 | 9/1998 | Ishikawa et al. | 439/164 |
| 5,865,634 | 2/1999 | Best | 439/164 |
| 5,993,229 | 11/1999 | Tanaka et al. | 439/164 |
| 6,019,621 | 2/2000 | Sugata et al. | 439/164 |

FOREIGN PATENT DOCUMENTS 11-140475  5/1999  Japan .

*Primary Examiner*—Gary F. Paumen
*Attorney, Agent, or Firm*—Karl D. Kovach; David L. Newman

[57] ABSTRACT

A clockspring having adhesive so as to resist vibratory motion of the flat ribbon cable and to reduce rubbing of the flat ribbon cable against itself. The clockspring includes a housing, a hub, and a flat ribbon cable connecting the hub to the housing. The flat ribbon cable has an adhesive along a majority of the length of the flat ribbon cable.

12 Claims, 4 Drawing Sheets

LOOP BACK CLOCKSPRING HAVING ADHESIVE LAYER

BACKGROUND OF THE INVENTION

1. Field of the Invention

The present invention pertains to a device for damping vibrations and reducing noise. The invention more particularly concerns the reduction or elimination of vibrations and rubbing of a flat ribbon cable contained within an automotive clockspring so as to reduce noise levels.

2. Discussion of the Background

Devices are well known in the art for damping the sound emanating from automobile clocksprings due to the vibration and rubbing noises of the flat ribbon cable contained within the clockspring housing. An automotive clockspring is an electrical connector or rotary transducer which electrically connects a rotatable airbag assembly mounted on the steering wheel to stationary crash sensors located elsewhere on the vehicle. An automotive clockspring typically includes a housing and a cover mounted to the housing so as to form a cavity therebetween. Rotatably mounted within the cavity is a hub. The clockspring housing is non-rotatably mounted to the steering column, while the hub is attached to the rotatable airbag assembly. A flat ribbon cable is wound around the hub. One end of the flat ribbon cable terminates at the stationary housing or cover and the other end terminates at the hub. The end of the flat ribbon cable terminated at the hub is then connected to an electrical cable which connects to the airbag assembly. During use, the flat ribbon cable is either spooled or un-spooled around the hub when the steering wheel is turned in one direction or the other direction.

One solution to solving the problem includes placing a carrier member within the cavity of the clockspring between the hub and the housing. Typically, the carrier member includes roller members. The carrier member is used to fill-up the empty space of the cavity and to compress a portion of the flat ribbon cable toward the inner most radius of the cavity and to press another portion of the flat ribbon cable toward the outermost radius of the cavity. Such a distribution of the flat ribbon cable requires the use of a turned back portion of the flat ribbon cable as is exemplified in U.S. Pat. No. 5,865,634, which is hereby incorporated herein by reference. The clockspring disclosed in U.S. Pat. No, 5,865,634 uses a carrier member having roller members, which allows such a device to use a short length of flat ribbon cable. Using a short length of flat ribbon cable is important since flat ribbon cable is expensive. The drawback of a clockspring having a carrier member is the increased cost of manufacturing and inventorying the piece parts of such a clockspring. A further, inherent drawback of such a design is the increased weight of the clockspring.

Another solution to the problem includes placing vibration dampers within the cavity of clockspring as is disclosed in U.S. Pat. No. 5,490,793, which is hereby incorporated herein by reference. The design and placement of the vibration dampers does not allow for use of the uniform distribution and placement of the flat ribbon cable as is possible with the design disclosed in U.S. Pat. No. 5,865, 634. Thus, a minimal length of flat ribbon cable is not used in the vibration damper design. However, the vibration damper design includes fewer parts than the carrier member design, and, hence, the vibration damper design weighs less than the carrier member design.

Thus, there is a need for a low-cost, reliable, light-weight, and simple to manufacture clockspring which does not generate audible sounds due to vibration and relative rubbing of the coils of the flat ribbon cable.

SUMMARY OF THE INVENTION

Therefore, it is an object of the present invention to provide a rotary connector such as a clockspring having a small number of parts which has a minimal number of assembly steps and is manufactured for a low cost.

It is a further object of the invention to provide a clockspring which does not radiate noise.

It is yet another object of the invention to provide a clockspring having a minimal length of flat ribbon cable.

It is still yet another object of the invention to provide a clockspring having a light weight.

It is another object of the invention to provide a clockspring having a low value of residual torque for rotating the hub relative to the housing.

In one form of the invention the clockspring includes a housing, a hub, and a flat ribbon cable connecting the housing to the hub. Where the flat ribbon cable has an adhesive element connected to the flat ribbon cable along a majority of a length of the flat ribbon cable.

In another form of the invention the clockspring includes a housing, a hub, and a flat ribbon cable. Where the flat ribbon cable includes a mechanical interlocking feature, such as a hook and loop design, or a tongue and groove design.

In a further form of the invention the clockspring includes a housing, a hub, a flat ribbon cable, and a separation member connected to the flat ribbon cable. The flat ribbon cable attaches the hub to the housing. The separation member having a means for adhering and a means for isolating.

In still yet another form of the invention the clockspring includes a housing, a hub, a flat ribbon cable, and a spacer attached to the flat ribbon cable. Where the flat ribbon cable attaches the hub to the housing.

In another embodiment a clockspring-type of device is incorporated into a retractable seat belt airbag connection.

In one form of the invention the retraction seat belt connection device includes a housing, a hub, and a flat ribbon cable connecting the housing to the hub. Where the flat ribbon cable has an adhesive element connected to the flat ribbon cable along a majority of a length of the flat ribbon cable.

In another form of the invention the retraction seat belt connection device includes a housing, a hub, and a flat ribbon cable. Where the flat ribbon cable includes a mechanical interlocking feature, such as a hook and loop design, or a tongue and groove design.

In a further form of the invention the retraction seat belt connection device includes a housing, a hub, a flat ribbon cable, and a separation member connected to the flat ribbon cable. The flat ribbon cable attaches the hub to the housing. The separation member having a means for adhering and a means for isolating.

In still yet another form of the invention the retraction seat belt connection device includes a housing, a hub, a flat ribbon cable, and a spacer attached to the flat ribbon cable. Where the flat ribbon cable attaches the hub to the housing.

In another embodiment the invention takes the form of a rotary connector includes a housing, a hub, and a flat ribbon cable connecting the housing to the hub. Where the flat ribbon cable has a retention element connected to the flat ribbon cable along a majority of a length of the flat ribbon cable. The retention element connected to the hub, and the retention element connected to the housing.

Thus, Applicants' invention is superior to the prior art. Applicants' invention provides a clockspring which reduces or prevents audible noise from being generated due to the motion of the flat ribbon cable without using a carrier member or vibration dampers. Therefore, the cost and complexity of manufacturing the clockspring is reduced, the weight of the resulting clockspring is less, the residual torque is decreased, and the reliability is increased. These and other features of the invention are set forth below in the following detailed description of the presently preferred embodiments.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PRESENTLY PREFERRED EMBODIMENTS

Figure 1:
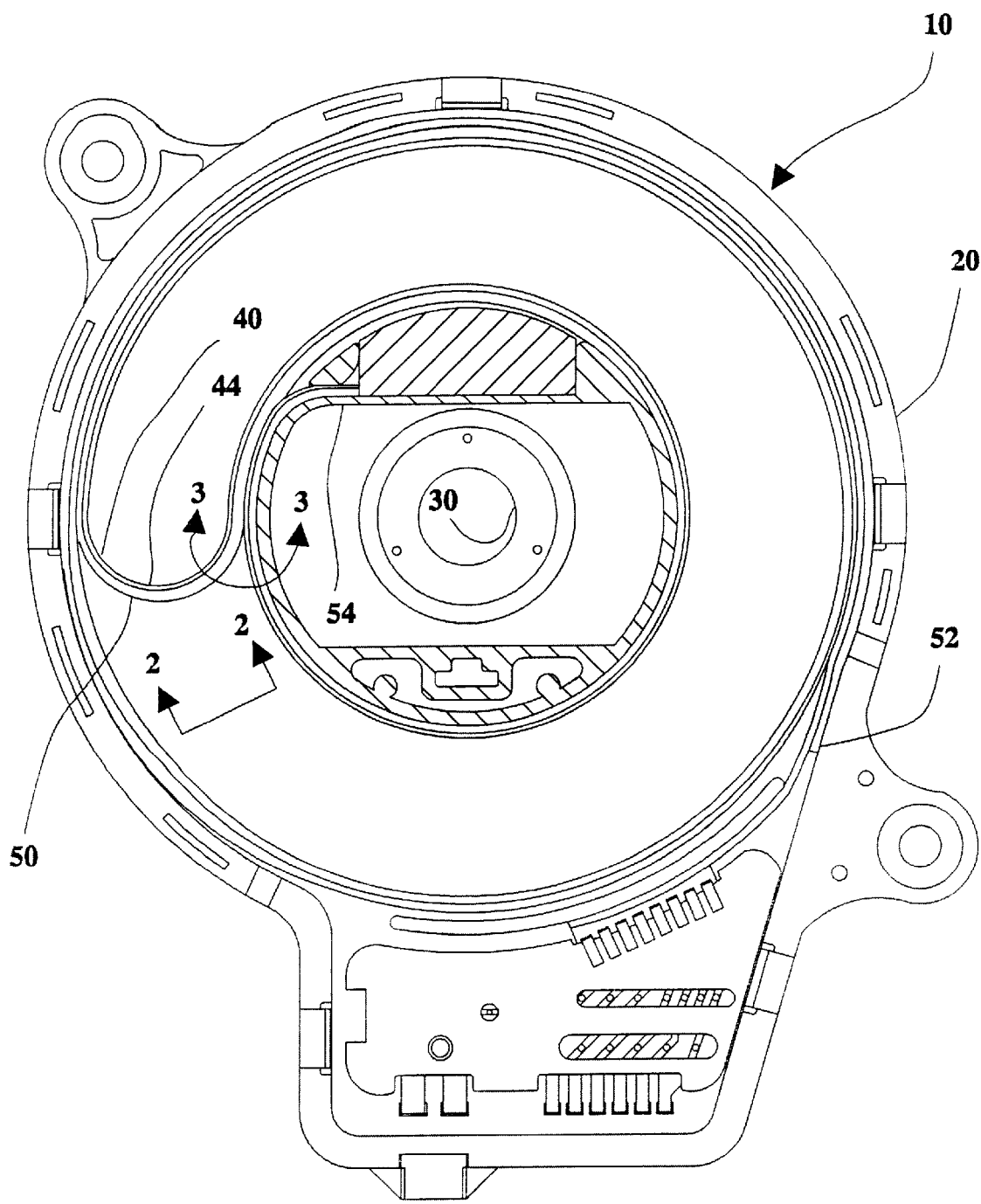
FIG. 1 is a cross-sectional, top view of a clockspring of the present invention.
Figure 2:
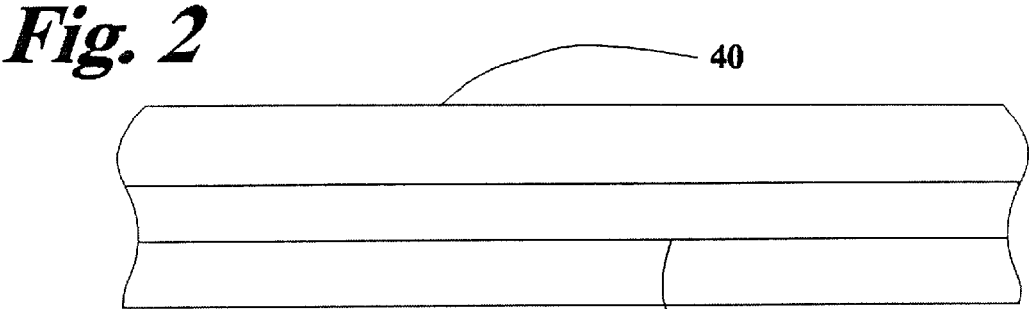
FIG. 2 is a side view of the flat ribbon cable taken along line 2—2 of FIG. 1.

Referring now to the drawings, wherein like reference numerals designate identical or corresponding parts throughout the several views, and more particularly to FIGS. 1–2 thereof, a first embodiment of the present invention is a rotary connector such as a clockspring 10 having a housing 20, a hub 30, and a flat ribbon cable 40. An adhesive element or retention element 50 is connected to the flat ribbon cable 40 along a majority of the length of the flat ribbon cable 40.

FIG. 1 is a cross-sectional, top view of the clockspring 10 with a cover (not shown) removed. A turned back portion 44 of the flat ribbon cable 40 clearly shows the adhesive element 50. A first end 52 of the adhesive element 50 is secured between the flat ribbon cable 40 and the housing 20, and a second end 54 of the adhesive element 50 is secured between the flat ribbon cable 40 and the hub 30.

FIG. 2 is a side view of the flat ribbon cable taken along line 2—2 of FIG. 1. FIG. 2 shows that the adhesive element 50 is applied only to a small portion of the total area available on the surface of the flat ribbon cable 40. The adhesive element 50 is most effectively applied near the center of the flat ribbon cable 40.

Typically, either during the manufacture of the flat ribbon cable 40 or after the manufacture of the flat ribbon cable 40, the adhesive element 50 is applied to one surface of the flat ribbon cable. The flat ribbon cable/adhesive element assembly is then attached to and wound around the hub 30. The flat ribbon cable/adhesive element/hub assembly is then set in and attached to the housing 20, thus forming the clockspring 10.

The adhesive tack of the adhesive element 50 is such that when a turned back portion 44 is formed, the flat ribbon cable 40 does not loose its shape. Thus, a carrier member having rollers is not advantageous in this embodiment. Furthermore, the adhesive element 50 maintains the round inside diameter shape of the hub 30 and round outside diameter shape of the housing 20 of the flat ribbon cable 40 without the use the carrier member and rollers. Additionally, the adhesive element 50 prevents the inherent nature of the flat ribbon cable 40 to expand radially outward or inward when the flat ribbon cable 40 is wound or unwound.

In practice, as shown in FIG. 1, the adhesive element 50 maintains the flat ribbon cable 40 against the hub 30, and the adhesive element 50 maintains the flat ribbon cable 40 against the housing 20, and, thus, the adhesive element 50 maintains the turned backed portion 44. As the hub 30 is rotated relative to the housing 20, the adhesive element 50 is either just coming into contact with a surface of the flat ribbon cable 40 or is just being separated from the same surface of the flat ribbon cable 40. This process can be carried out multiple times without the flat ribbon cable 40 loosing its shape. When the adhesive element 50 comes into contact with a surface of the flat ribbon cable 40, the adhesive element 50 adheres to that surface of the flat ribbon cable 40 and remains adhered to that surface until the adhesive element 50 is removed from that surface. Since the flat ribbon cable 40 stays in a predetermined location, the flat ribbon cable 40 does not rub or vibrate against itself. Furthermore, the rubbing or vibrating of the flat ribbon cable 40 against the housing 20 and the hub 30 is also reduced. Thus, the clockspring 10 is quiet during operation.

Another benefit of the flat ribbon cable 40 maintaining the shape shown in FIG. 1 is that the required length of the flat ribbon cable 40 is nearly a minimum, thus cost and weight are lowered.

The hub 30 and housing 20 are typically made of a polymer material.

The outer surfaces of the flat ribbon cable 40 are preferably made of a polyester material such as MYLAR® by E. I. Du Pont De Nemours and Company.

The adhesive element 50 is preferably made of a flexible, extensible, silicone gel sealant strip material marketed under the name GELTEK® which is manufactured by Raychem Corporation. The adhesive element 50 has an adhesive force or tack of at least twenty-five grams when a sheet of the material is put in contact with a circular, one inch diameter surface. The material of the adhesive element 50 has an apparent density of 0.85 grams per cubic centimeter. The material of the adhesive element 50 has a tensile strength of 8 pounds per square inch. Elongation to rupture of the material of the adhesive element 50 is one hundred-fifty percent of its undeformed length.

The adhesive element 50 typically has a thickness dimension which is greater than the thickness dimension of the flat ribbon cable 40. The thickness dimension of the adhesive element 50 is usually between one-half inch and one-thirty-second of an inch. The adhesive element 50 typically has a width dimension which is less than the width dimension of the flat ribbon cable 40. The width dimension of the adhesive element 50 is usually between one-half inch and one-thirty-second of an inch.

Alternatively, an adhesive can be sprayed or applied to a surface of the flat ribbon cable 40 so as to effect results similar to that realized with the adhesive element 50.

A further modification of the above-described embodiment is to provide a separation member between the layers of the flat ribbon cable so as to avoid the noise problem. The separation member is similar to the adhesive element in that the separation member has a means for adhering to the flat ribbon cable. Furthermore, due to material characteristics and size, the separation member has a means for isolating vibrational energy so as to reduce noise. The separation member could be a (felt-like substance coated with an adhesive).

Another modification of the above-described embodiment is to provide a spacer between the layers of the coiled flat ribbon cable. As the flat ribbon cable slides and vibrates, the spacer physically locates each layer of the coiled flat ribbon cable away from each other. Thus, the various sections of the flat ribbon cable are not able to touch one another and the clockspring then performs quietly. The spacer may be a felt-like substance connected to one surface of the flat ribbon cable.

Figure 3:
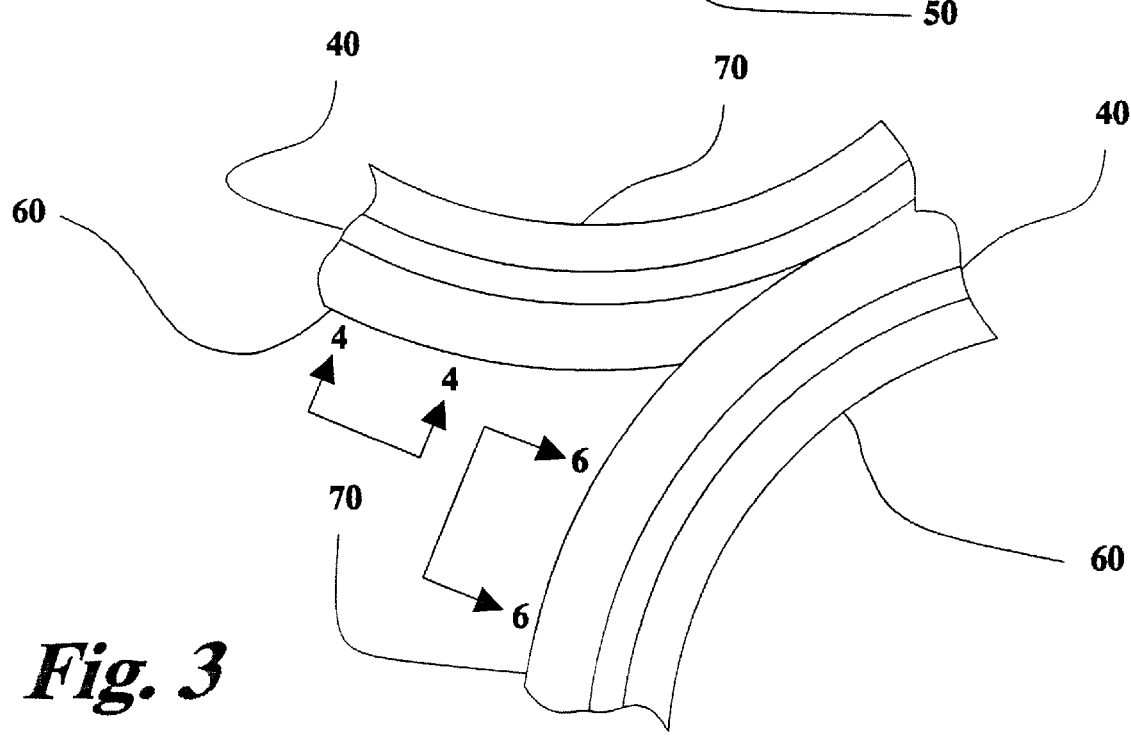
FIG. 3 is a side view of another embodiment of the invention which is taken along a line similar to line 3—3 of FIG. 1.

Another embodiment of the invention is shown in FIG. 3. FIG. 3 is a side view of the second embodiment of the invention taken along a line similar to line 3—3 of FIG. 1. FIG. 3 shows a tongue layer 60 attached to a first surface of the flat ribbon cable 40, and a groove surface 70 attached to another surface of the flat ribbon cable 40 which forms an interlocking structure.

Figure 4:
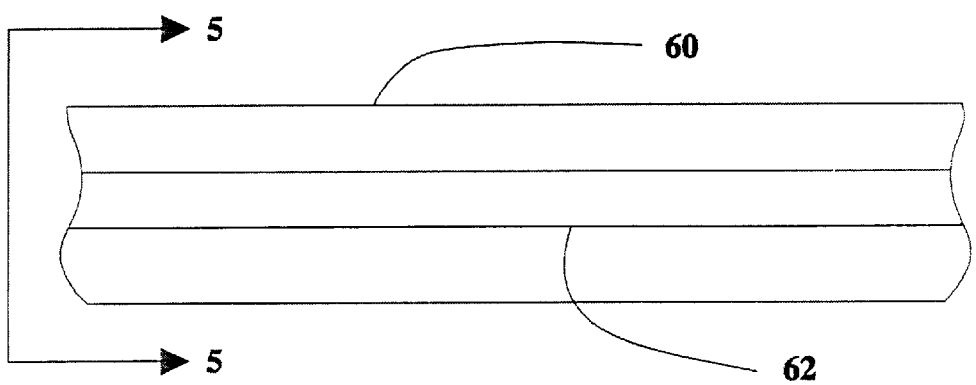
FIG. 4 is a side view of one surface of the flat ribbon cable taken along line 4—4 of FIG. 3.
Figure 5:
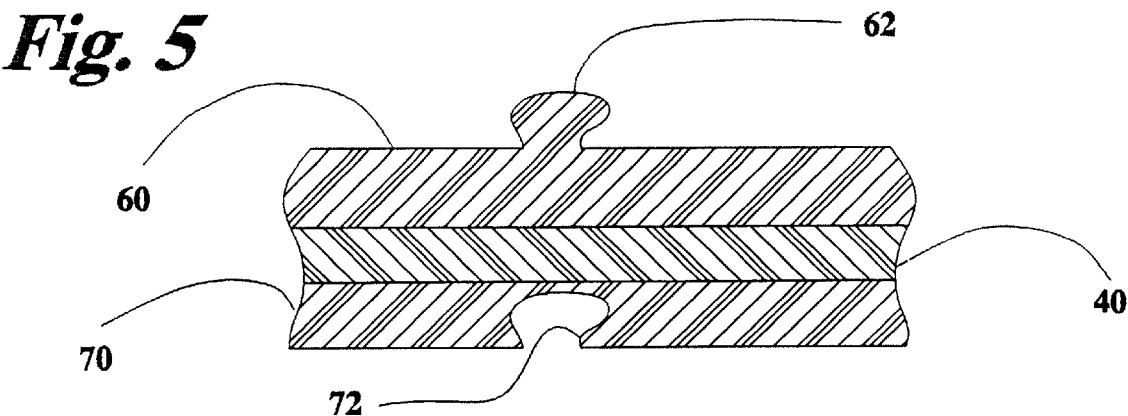
FIG. 5 is a cross-section view of the flat ribbon cable taken along line 5—5 of FIG. 4.

FIG. 4 is a side view of one surface of the flat ribbon cable showing the tongue layer 60. FIG. 5 is a cross-section view of the embodiment showing flat ribbon cable 40, the tongue layer 60, and the groove layer 70. The tongue layer 60 has a tongue 62 protruding from the tongue layer 60. The tongue layer 60 can be connected to or formed as part of the flat ribbon cable 40.

Figure 6:
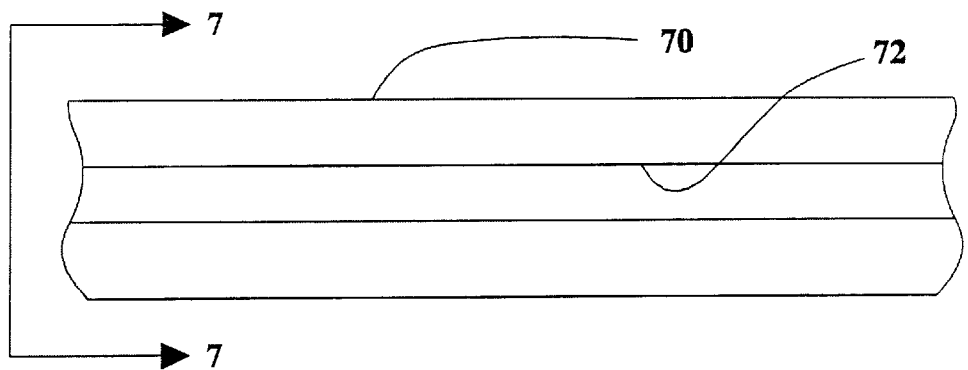
FIG. 6 is a side view of another surface of the flat ribbon cable taken along line 6—6 of FIG. 3.
Figure 7:
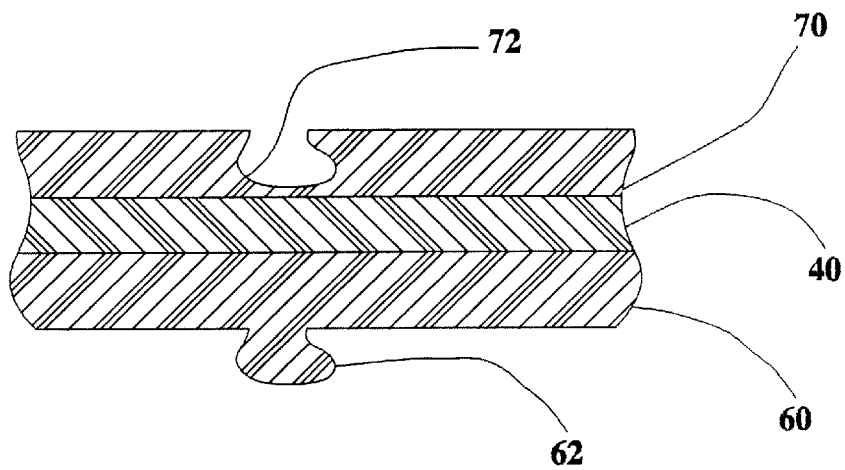
FIG. 7 is a cross-sectional view of the flat ribbon cable taken along line 7—7 of FIG. 6.

FIG. 6 is a side view of the other surface of the flat ribbon cable showing the groove surface 70. FIG. 7 is a cross-section view of the embodiment showing flat ribbon cable 40, the tongue layer 60, and the groove layer 70. The groove layer 70 has a groove 72 formed therein. The groove layer 70 can be connected to or formed as part of the flat ribbon cable 40.

As can be seen from FIG. 3, as the tongue 62 is introduced to the groove 72, the tongue 62 presses against the groove 72. Once enough force is applied to the groove 72 by the tongue 62, the groove 72 widens and the tongue 62 enters the groove 72 and becomes locked in-place. The tongue 62 and groove 72 become interlocked since they both have complementary shapes to each other. Alternatively, when enough force is applied to the union of the tongue 62 and the groove 72 in an effort to separate the interlocking structure, the groove 72 widens and the tongue 62 slides out of the groove 72. The operation of the clockspring is the same as discussed above.

Figure 8:
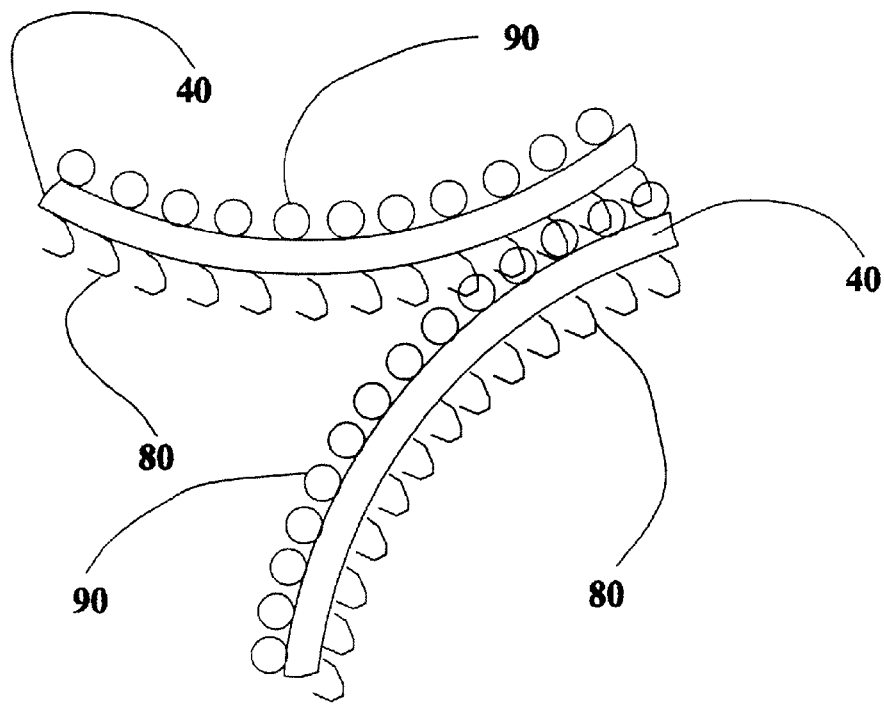
FIG. 8 is a side view of yet another embodiment of the invention which is taken along a line similar to line 3—3 of FIG. 1.

A fourth embodiment of the invention is shown in FIG. 8. FIG. 8 is a side view of the fourth embodiment of the invention taken along a line similar to line 3—3 of FIG. 1. FIG. 8 shows a hook and loop type of fastening or interlocking system. A first surface of the flat ribbon cable 40 has hooks 80 attached thereto, and a second surface of the flat ribbon cable 40 has loops 90 attached thereto. When the hooks 80 come into contact with the loops 90, the hooks 80 and loops 90 become locked together, thus securing the flat ribbon cable 40. The hooks 80 and loops 90 come out of engagement with each other when the two adjacent sections of flat ribbon cable are separated from each other. The operation of the clockspring is the same as discussed above.

In further embodiments, the invention previously discussed may be incorporated into other rotary connectors such as a retractable seat belt airbag connection device. This is important since airbags are being incorporated into the seat belt harness. To accommodate passengers of various sizes, the seat belt connection device spools and un-spools, much like a clockspring in a steering column, to make a comfortable fit on the passenger. The retractable seat belt airbag connection device includes a hub, a housing, and a flat ribbon cable, just like a clockspring, however, this device is mounted in the retractable seat belt airbag connection device. All of the embodiments previously discussed in regard to the clockspring are directly applicable to the retractable seat belt airbag connection device, and will not be further discussed.

Obviously, numerous modifications and variations of the present invention are possible in light of the above teachings. It is therefore to be understood that within the scope of the appended claims, the invention may be practiced otherwise than as specifically described herein.

What is claimed is:

1. A clockspring comprising:

a housing;

a hub rotatable relative to the housing;

a flat ribbon cable having a length, the flat ribbon cable connecting the hub to the housing; and an adhesive element connected to the flat ribbon cable along a majority of the length of the flat ribbon cable.

2. The clockspring according to claim 1 wherein the flat ribbon cable has a turned back portion.

3. The clockspring according to claim 2 wherein the adhesive element has a thickness dimension and a width dimension.

4. The clockspring according to claim 3 wherein the thickness dimension is less than one-half of an inch, and wherein the thickness dimension is greater than one-thirty-second of an inch.

5. The clockspring according to claim 4 wherein the width dimension is less than one-half of an inch, and wherein the width dimension is greater than one-thirty-second of an inch.

6. The clockspring according to claim 5 wherein the adhesive element is structurally compliant.

7. The clockspring according to claim 6 wherein the adhesive element has an adhesive force being less than twenty-five grams.

8. The clockspring according to claim 7 wherein the adhesive element is made of a flexible, extensible, silicone gel material.

9. The clockspring according to claim 3 wherein the flat ribbon cable has a thickness, and wherein the thickness of the adhesive element is greater than the thickness of the flat ribbon cable.

10. The clockspring according to claim 9 wherein the flat ribbon cable has a width, and wherein the width of the flat ribbon cable is greater than the width of the adhesive element.

11. A clockspring comprising:

a housing;

a hub rotatable relative to the housing;

a flat ribbon cable having a length, the flat ribbon cable coiled between the hub and the housing and connecting the hub to the housing; and an adhesive element connected to the flat ribbon cable along a majority of the length of the flat ribbon cable, the adhesive element connected to the hub, and the adhesive element connected to the housing.

12. The clockspring according to claim 11 wherein the flat ribbon cable has a turned back portion.

* * * * *